United States Patent
Ferreira Marinho

(10) Patent No.: US 10,279,861 B2
(45) Date of Patent: May 7, 2019

(54) DEVICE FOR BICYCLES AND OTHER PEDAL-POWERED VEHICLES

(71) Applicant: José Manuel Ferreira Marinho, Lagares (PT)

(72) Inventor: José Manuel Ferreira Marinho, Lagares (PT)

(*) Notice: Subject to any disclaimer, the term of this patent is extended or adjusted under 35 U.S.C. 154(b) by 223 days.

(21) Appl. No.: 15/030,071

(22) PCT Filed: Oct. 20, 2014

(86) PCT No.: PCT/IB2014/065486
§ 371 (c)(1),
(2) Date: Apr. 18, 2016

(87) PCT Pub. No.: WO2015/056251
PCT Pub. Date: Apr. 23, 2015

(65) Prior Publication Data
US 2016/0272276 A1    Sep. 22, 2016

(30) Foreign Application Priority Data
Oct. 18, 2013 (PT) .......................................... 107242

(51) Int. Cl.
  B62M 3/06   (2006.01)
  B62M 9/04   (2006.01)
  B62M 1/24   (2013.01)
  B62M 3/08   (2006.01)
  B62M 1/30   (2013.01)
(52) U.S. Cl.
  CPC ................ B62M 3/06 (2013.01); B62M 1/24 (2013.01); B62M 1/30 (2013.01); B62M 3/08 (2013.01); B62M 9/04 (2013.01)

(58) Field of Classification Search
  CPC . B62M 3/06; B62M 3/08; B62M 9/04; B62M 1/24
  See application file for complete search history.

(56) References Cited

U.S. PATENT DOCUMENTS 2,653,037 A * 9/1953 Lassiter ................... B62K 9/00
                                                          280/258
2,690,083 A * 9/1954 Iseman .................... B62M 9/04
                                                          474/72

(Continued)

FOREIGN PATENT DOCUMENTS

EP        0104707      *  4/1984
EP     2394899 A2        12/2011
WO    WO 99/37529      *  7/1999

Primary Examiner — Vinh Luong
(74) Attorney, Agent, or Firm — Wenderoth, Lind & Ponack, L.L.P.

(57) ABSTRACT

A device for bicycles or other pedal-powered vehicles is fitted with at least one crank that has a pedal at one end and a crank box on the other. The crank box is fitted with a flute and contiguous to a fixed structure fitted with a pin. The movement of the crank is limited by the pin's movement in the flute. The crank box has a torsion spring nested within it. The device is fitted with a braking mechanism of the crankshaft's sprockets, in that these sprockets engage with sprockets of a transmission box, connecting the transmission box to the toothed shaft's box. The sprockets of the transmission box, in turn, transmit their movement to the outer shaft.

7 Claims, 18 Drawing Sheets

(56) References Cited

U.S. PATENT DOCUMENTS

| | | | |
|---|---|---|---|
| 3,837,234 A * | 9/1974 | Chao | B62M 9/04 |
| | | | 474/29 |
| 4,108,459 A | 8/1978 | Alvigini | |
| 8,534,404 B2 * | 9/2013 | Juan | B60K 6/00 |
| | | | 180/165 |
| 2010/0230924 A1 * | 9/2010 | Kraus | A63B 22/001 |
| | | | 280/210 |
| 2011/0251008 A1 * | 10/2011 | Schmitz | B62M 11/06 |
| | | | 475/31 |

* cited by examiner

DEVICE FOR BICYCLES AND OTHER PEDAL-POWERED VEHICLES

BACKGROUND OF THE INVENTION

Field of the Invention

The present invention concerns a device that is equipped in newly assembled bicycles or other pedal-powered vehicles and can be coupled to current existing vehicles by means of retrofitting, enabling these to be placed in motion by operating one or two pedals or one or two handles without requiring too much effort, balance and/or strength from the user.

On the contrary, the bicycle is equipped with a mechanism that is easily activated and does not require special skills.

It can be used by any person and is particularly useful for people with physical disabilities, since the leg or arm movement that triggers the mechanism is done vertically, in other words, the movement is down, up, down, up, etc.

Description of the Related Art

There already exist several devices that place in motion the gears fitted in bicycles or other pedal-powered vehicles by means of cranks, usually triggered by pedals.

However, there is no device like the one invented, since it enables to solve several technical issues such as those mentioned next.

Firstly, it enables to solve the neutral shift issue that bicycles with a traditional crank movement have (i.e., a circular movement).

In fact, to place a traditional bicycle in motion, the cranks cannot be aligned in the vertical position.

So, whenever there are two cranks, something which is not mandatory in this invention, they are never aligned in the vertical position, avoiding the neutral issue.

In this invention, the cranks (or crank) only make a small arc of a circle and not a 360° turn.

This way, the user's movement in a vehicle equipped with the invented device (which we will designate as cyclist for convenience) is made with his feet, or foot, in a repetitive down, up, down, up movement, requiring only downward pressure in the pedals (or pedal), since the upward movement of each pedal is ensured by a spring.

Concern was shown in developing a device in which the cyclist could perform, with one foot or one hand, a simple repetitive movement and not the usual circular movement.

Likewise, for convenience, any pedal-powered vehicle will be designated from this point on as bicycle.

Another goal of the present invention is the use of two cranks or a single crank with a length greater than the standard one and that, despite this fact, never touches the front wheel of the bicycle.

The fact that the crank is considerably larger than the standard one and does not touch the front wheel is vital from a safety perspective, particularly when the cyclist attempts to curve.

In fact, in the present invention, each crank is limited to a small rotation lower than 90°.

For this reason, the crankshaft can be much closer to the bicycle's front wheel than usual, enabling the crank to have a significantly larger shaft than those used in standard devices.

Also, the further back the cyclist's position, the larger the crank can be.

In the case of a tricycle, the cyclist is usually seated above the wheels' rear shaft, since this position is further back than in bicycles.

In a tricycle of this kind, the crank will have a larger length and can be triggered by means of a handle.

The larger the crank's shaft, the lesser the strength required from the cyclist.

It must be added that, in general, in the so-called handbikes, the drive wheel is the front one, meaning that the weight of the cyclist is substantially shifted to that wheel.

This is inconvenient, particularly in slippery pavements where the front wheel may remain spinning uncontrollably, with no traction.

This inconvenience is solved with the current invention, since the drive wheel (or wheels) are located in the rear, where the weight of the cyclist is shifted.

Besides this, the invented device can also be stopped in a way that leaves the crank or cranks motionless so the cyclist may rest comfortably, with his feet on the pedals, while the bicycle maintains the built-up speed.

Also, the crankshaft is in front of the chain's sprockets (chainring), in other words, as previously mentioned, that shaft is closer to the bicycle's front wheel. As such, it is vital that the invented device enables a convenient ratio of speeds and, thus, integrate a gearbox that solves the added weight issue from the sprockets being directly activated by the crankshaft, a structure that is not equipped in standard bicycles.

It is necessary to take into account that the device has particular interest to people with physical disabilities, namely leg amputees who need to change gears, particularly in tight places, and perform climbs with ease and comfort.

The device is also intended to be compact and remain sealed with a cover, in order to avoid the cyclist from hurting himself in the gears and protect them from dust and other dirt that deteriorates them.

These and other technical aspects with several advantages are described below in detail.

BRIEF SUMMARY OF THE INVENTION

This invention concerns a device that is equipped in bicycles or other traditional pedal-powered vehicles, fitted with at least one crank.

With a crank for the right foot, its movement is limited to a small rotation lower than 90° that only occurs counterclockwise from 12 to 6 or clockwise from 6 to 12.

Regarding the left crank, the corresponding movement can only take place clockwise from 12 to 6 or counterclockwise from 6 to 12.

Each crank has a crank box at its rearmost end. The crank box is fitted with a unidirectional bearing box. The device is characterized in that each crank is fitted with a pedal or handle on the other end.

The concerned unidirectional bearing enables the movement that the user performs when pressing the pedal down (a near vertical movement) to be transmitted to the crankshaft, but when the pedal makes the opposite movement—downwards to upwards—by means of a torsion spring, this movement is not transmitted to the shaft.

It is also characterized in that the mentioned crank box is fitted with a flute, the crank box is contiguous to a fixed structure fitted with a pin, the crank movement is limited by the pin's movement within the flute, and the crank box has a torsion spring nestled at its lower end. One end of the torsion spring is attached to the crank box and the other end of the torsion spring is attached to the fixed structure. The device is fitted with a braking mechanism for the crankshaft's sprockets, which are attached to the sprockets of the transmission box. The sprockets of the transmission box move the crankshaft of the chainring.

The term flute relates to the traditional sense of the word, that is to say, referring to a groove, rail or guide.

The braking or locking/unlocking mechanism of the sprockets of the crankshaft must be triggered by a cable controlled through a handle installed in the bicycle's handlebar.

In the unlocking position, the cable compresses the spring against a block. Since the spring is connected to a wedge, it remains in an upper position that keeps it away from the sprockets, not interfering with their movement.

When the spring stretches—something that takes place whenever the handle is used to relieve the cable—the wedge, which can have a mark to serve as a guide to its pin, will descend, making the pin go down until it locks into the sprockets, which will prevent them from moving.

This braking mechanism can be abridged to just the wedge with the guide and the cable.

Whenever the cable is relieved, the wedge will descend through gravity, blocking the sprockets of the crankshaft.

This braking mechanism is characterized either in that it is fitted with a wedge with a guide that is activated by a spring with a block controlled by a cable or in that it is simply fitted with a wedge with a guide activated by a cable.

The invented device is also characterized in that has a dual-shaft transmission box (one inside of the other), an outer shaft with a slot, an inner shaft that is at least partially toothed, an unattached latch integrated in the inner shaft, a latch that latches, in turn, into the sprockets of the transmission box, which is the motor shaft of the chainring, and in that the toothed inner shaft is attached to a toothed shaft that makes it move when it is spinning.

As soon as the toothed shaft is triggered, spinning around its axis, its teeth, attached to the teeth of the inner shaft of the transmission box, make the inner shaft and also the latch integrated in it shift crosswise.

On the other hand, the latch, during its crosswise movement, will go through the slot of the outer shaft of the transmission box and, in turn, latch to the sprockets of the transmission box. The sprockets will, preferably, be fitted with one or more gaps where the top of the latch fits into.

This way, the movement of a given sprocket of the transmission box is transmitted to the latch, pushing its front side against the outer shaft of the transmission box. This way, it will gain speed with the movement of that sprocket.

The invented device is also characterized in that the toothed shaft is housed in a box. This box is fitted with an outer lid (with an inner lid being also a possibility). The box is also fitted with both a middle lid and an upper lid, where the middle lid is fitted with a torsion spring and is attached to one of the ends of the torsion spring. The other end of the torsion spring is attached to the top of the toothed shaft.

When the upper lid of the toothed shaft's box spins by the action of a cable, which can be triggered through a handle located in the bicycle's handlebar, the top of the toothed shaft will spin, which will transmit the movement of the inner toothed shaft of the transmission box.

Whenever this cable is pulled, the toothed shaft spins around its axis, spinning the spring around itself and leaving the spring under tension.

When the cable is relieved, the spring automatically losses tension and, while attached to the top of the shaft, forces it to spin in the opposite direction.

This way, depending whether the top of the toothed shaft spins clockwise or counterclockwise, the inner toothed shaft of the transmission box will move crosswise from one side to the other of the bicycle.

When triggering the inner toothed shaft as described, the latch (which is connected to the inner toothed shaft) will, in turn, engage the sprockets of the transmission box.

Thus, the sprockets coupled to the crankshaft will spin the several sprockets of the transmission box, permanently engaging them in pairs (one at the front and another at the back). The latch, by engaging, in turn, one single sprocket of the transmission box, transfers the movement of that sprocket to the outer shaft of said transmission box.

On the other hand, the sprockets coupled to the crank, as well as the braking mechanism, are protected by a cover.

As a result of what is mentioned above, the invented device is simple and the cyclist, by exerting a descending force perpendicular to the ground in a single pedal enables the vehicle to move with ease.

This invention can be built by using materials with a good weight/resistance ratio and a size that minimizes the space occupied.

DETAILED DESCRIPTION

In the attached figures, shown as an example, it is possible to observe the mentioned invented device and its parts as follows.

Figure 1:
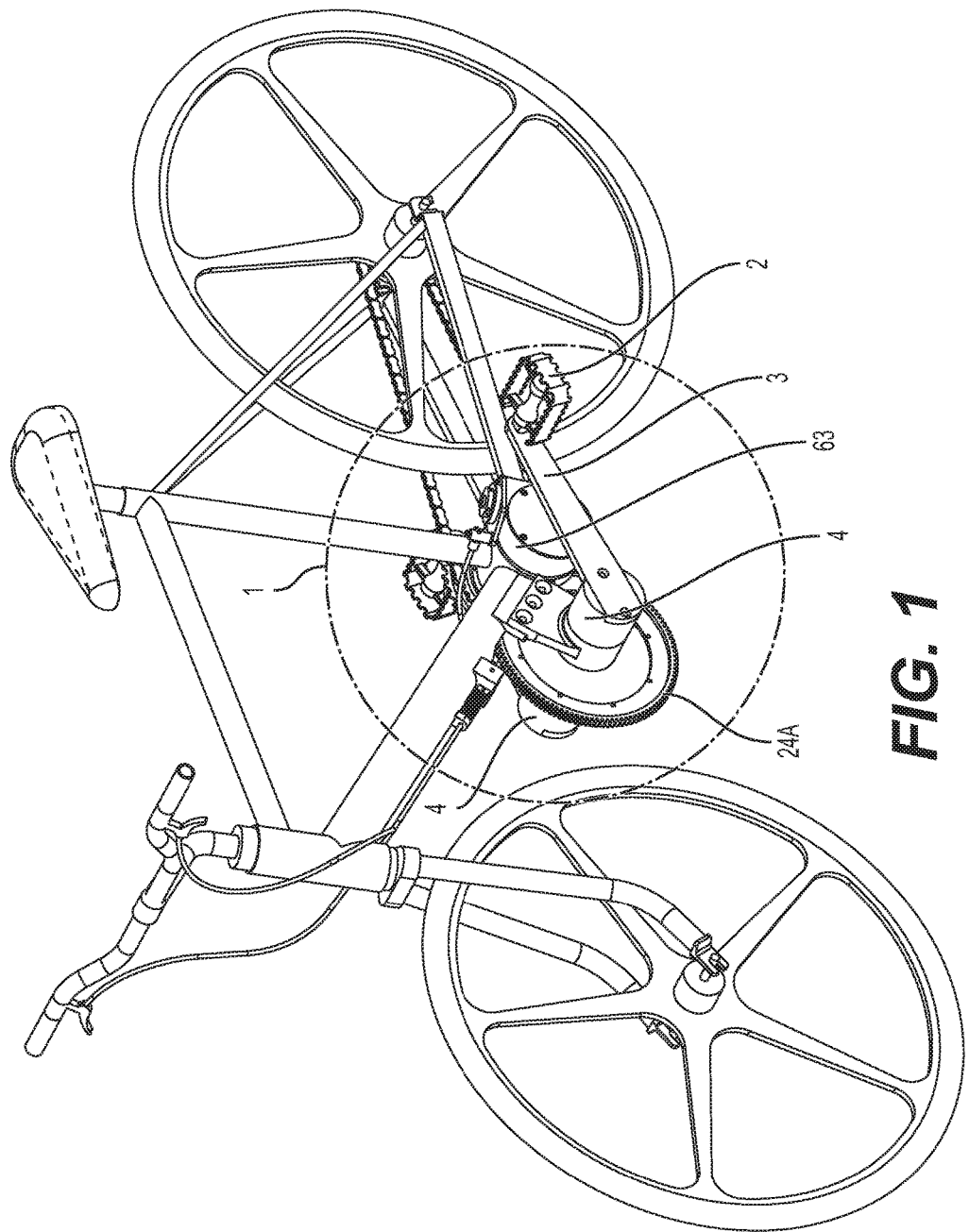
FIG. 1 illustrates a perspective view of a bicycle including a first embodiment of the present disclosure.

FIG. 1 shows a perspective of a bicycle integrating the invented device (1). Each crank (3)—in the bicycle that is shown there are two cranks (3)—has a crank box (4) coupled to its rear end and a pedal (2) in its front end, where the movement of each of the cranks (3) triggers the respective shaft that puts in motion the respective sprockets (24A, 24B, 24C), which are also visible, enabling to view the toothed shaft box (63).

Figure 2:
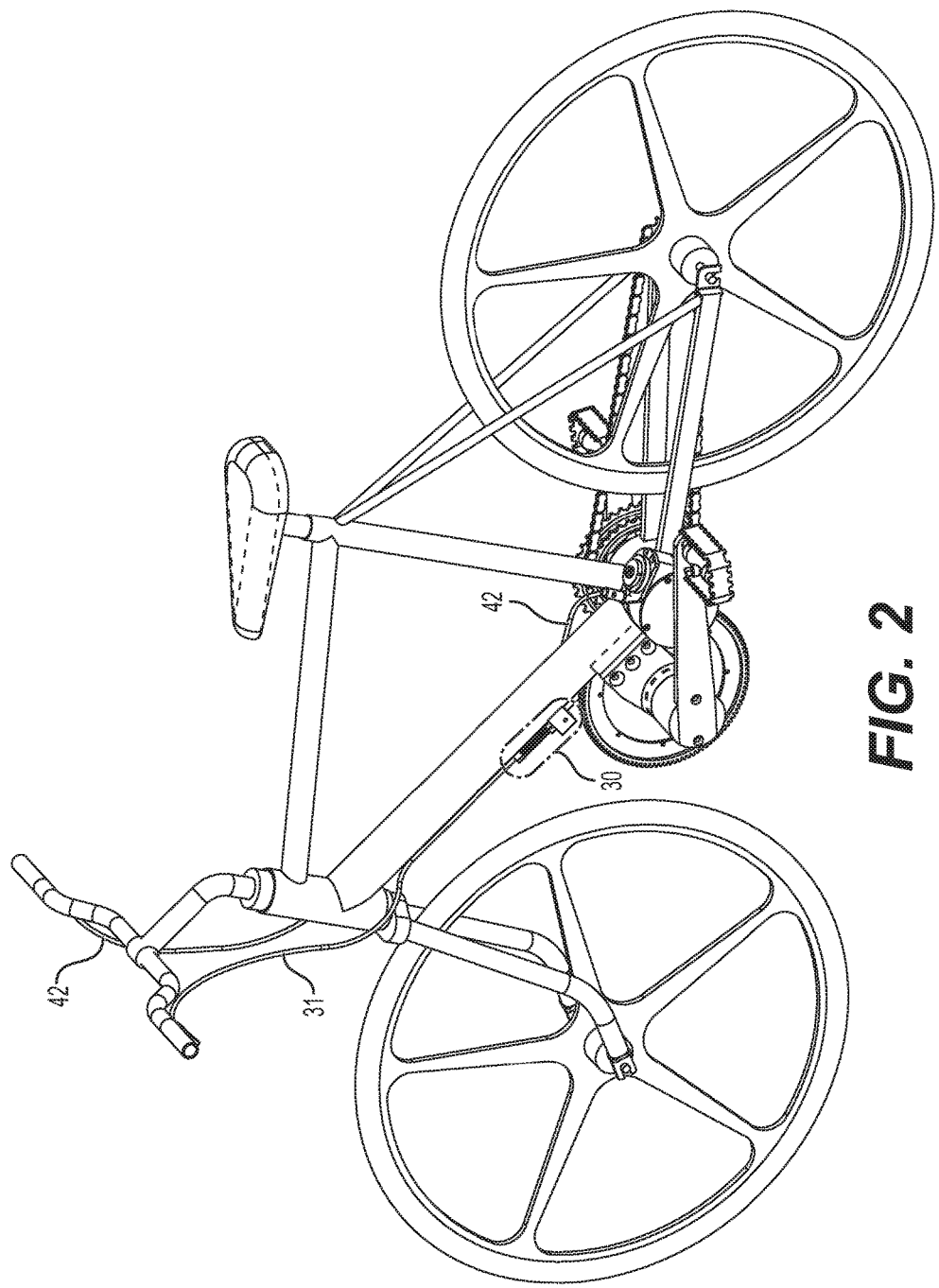
FIG. 2 illustrates a different perspective view of the bicycle of FIG. 1.

FIG. 2 shows the bicycle of the previous figure in a different perspective, better showing the braking mechanism (30) and the respective triggering cable (31), as well as the cable that triggers the transmission box (42), which is activated by a handle located in the handlebar.

Figure 3:
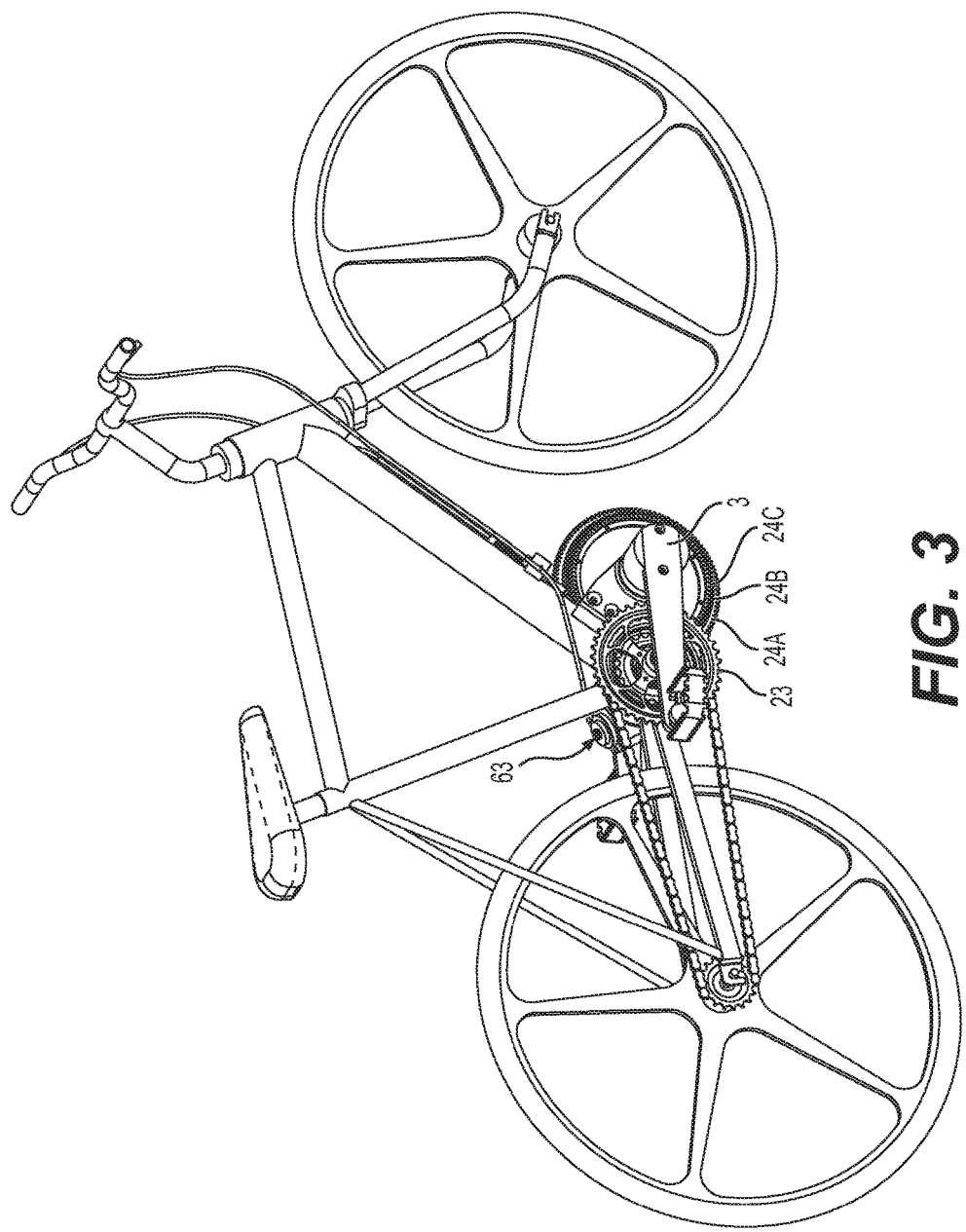
FIG. 3 illustrates another perspective view of the bicycle of FIG. 1 that is rotated 180° in relation to FIG. 1.

FIG. 3 shows a perspective of the same bicycle but turned around 180° in relation to FIG. 1. The crank (3) on the right side, the sprockets (24A, 24B, 24C) of the crankshaft (20) and the chainring (23) are visible, and the transmission of the movement between them is made through several shafts and one of them (the toothed shaft) is located in the respective box (63), also shown in the figure.

Figure 4:
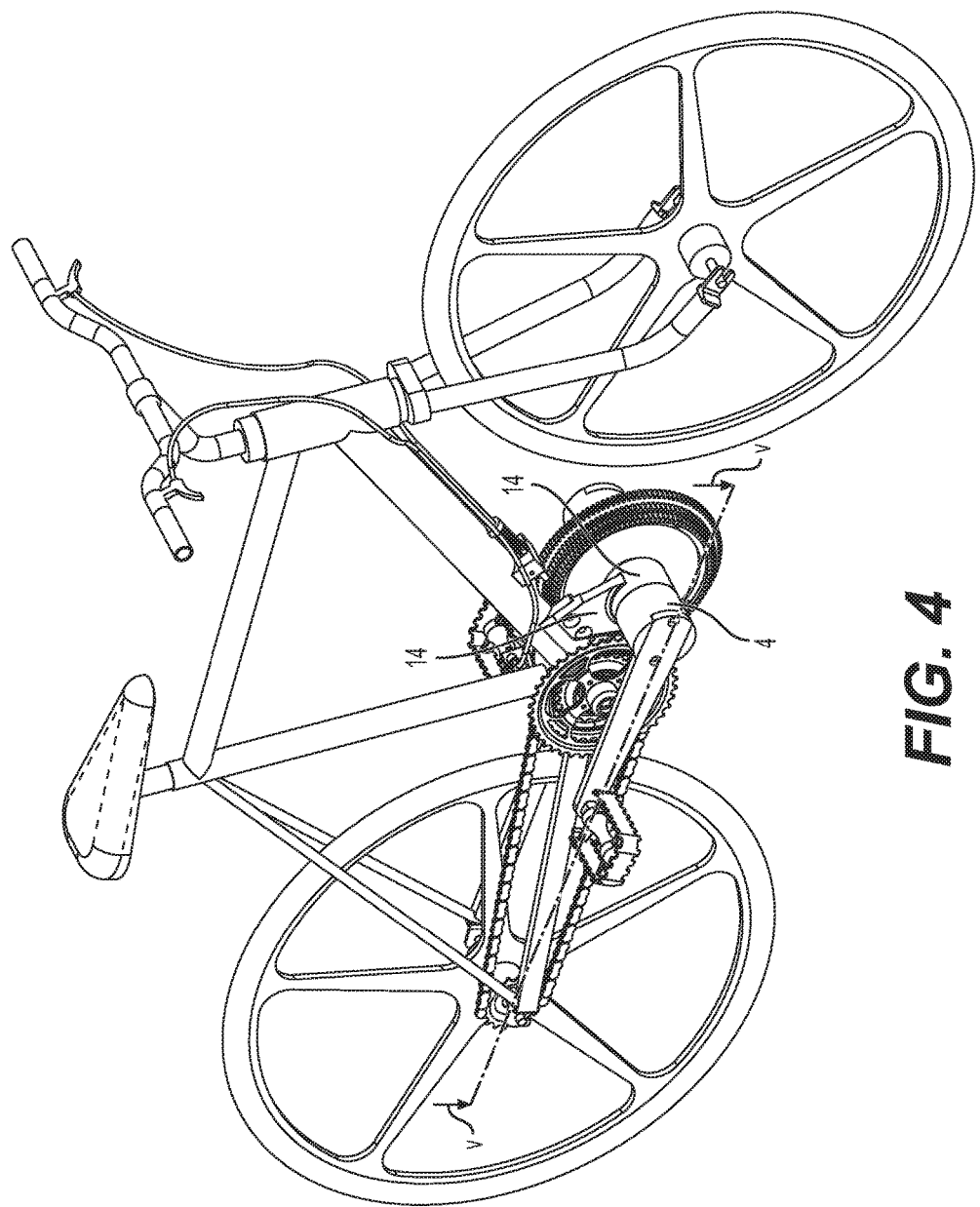
FIG. 4 illustrates another perspective view of the bicycle of FIG. 1 that is rotated 180° in relation to FIG. 2.

FIG. 4 shows a perspective of the same bicycle but turned around 180° in relation to FIG. 2. The crank (3) on the right side, the pedal on the rear end, the crank box (4) on the front end and the fixed structure (14) that holds the crankshaft are visible.

Figure 5:
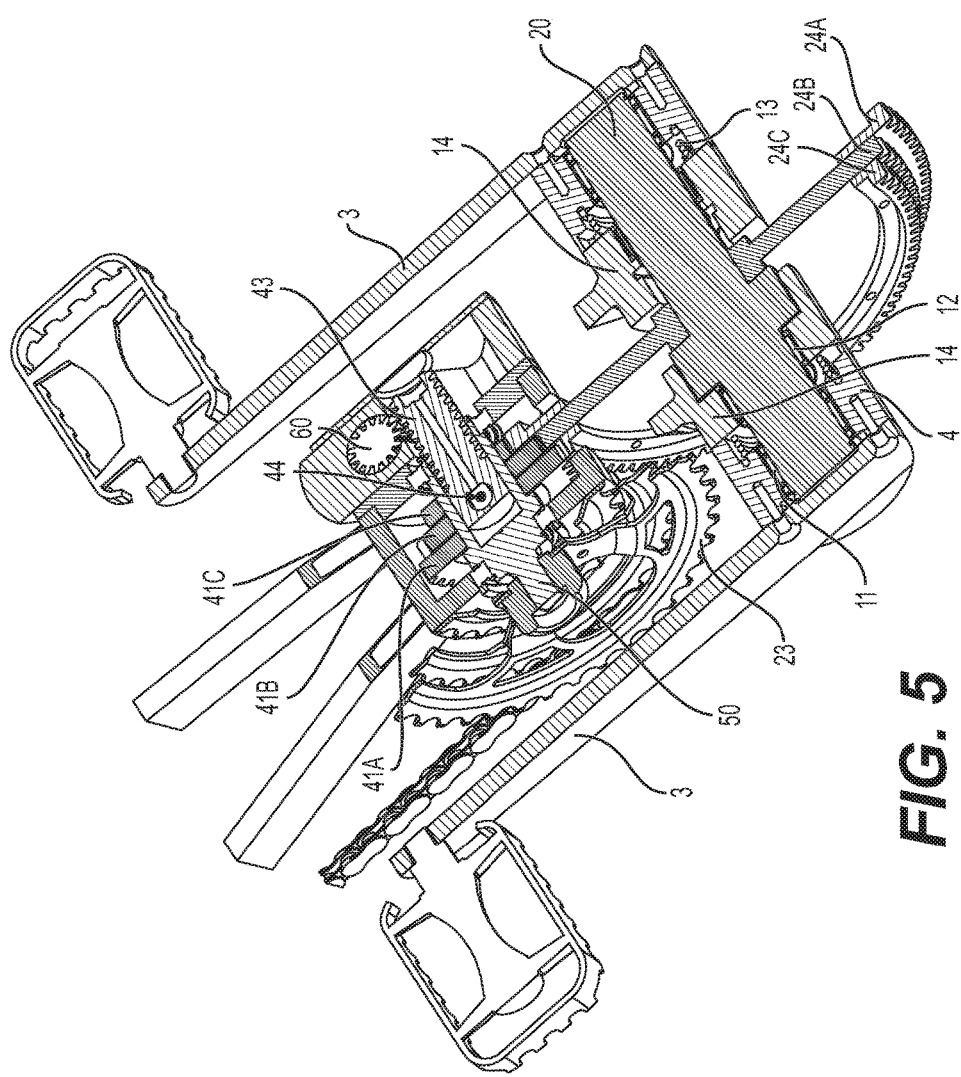
FIG. 5 illustrates a sectional view of the first embodiment taken along line V-V in FIG. 4.

FIG. 5 shows a horizontal plane that has the diameter of each of the two crank boxes (4)—a plane represented by the perspective view. The connection of each crank (3) to the respective crank box (4) are visible. The unidirectional bearings (11) of each of those crank boxes (4), the torsion springs (13) located on the inner side of each of these crank boxes, the fixed structure (14) that holds the crankshaft—also shown (20)—each of them with their bearing (12) are also visible. The sprockets (24A, 24B, 24C) of the crankshaft (20), the sprockets (41A, 41B, 41C) of the transmission box (40), the chainring (23), the three shafts that enable the movement of those sprockets (24A, 24B, 24C) to be transmitted to them (23)—respectively the toothed shaft (60), the inner toothed shaft (43) and the outer shaft (50)—and the niche of the inner toothed shaft (44) are further visible.

Figure 6:
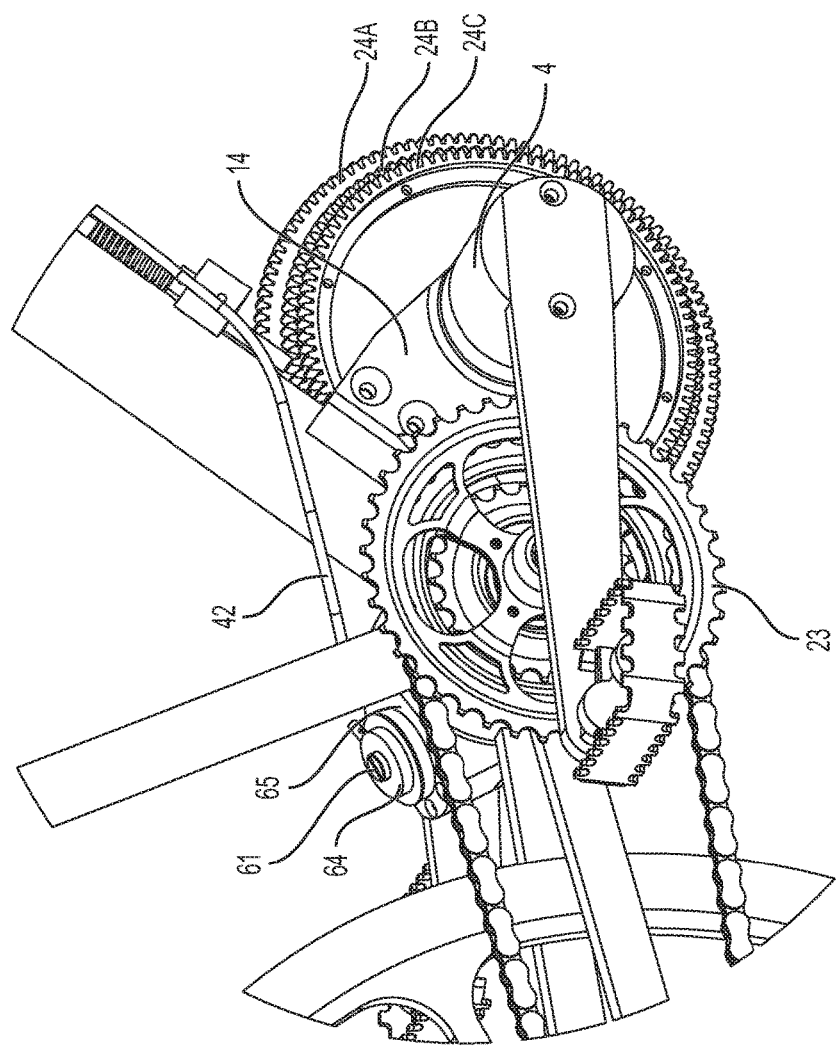
FIG. 6 illustrates a magnified view of the first embodiment.

FIG. 6 details the perspective of the invented device. The cable that triggers the transmission box (42), the chainring (23), the sprockets (24A, 24B, 24C) of the crankshaft (20), the crank box (4) of the bicycle's right side, the fixed structure (14), the top of the toothed shaft (61) and the upper (64) and middle lids (65) of the toothed shaft's box are visible.

Figure 7:
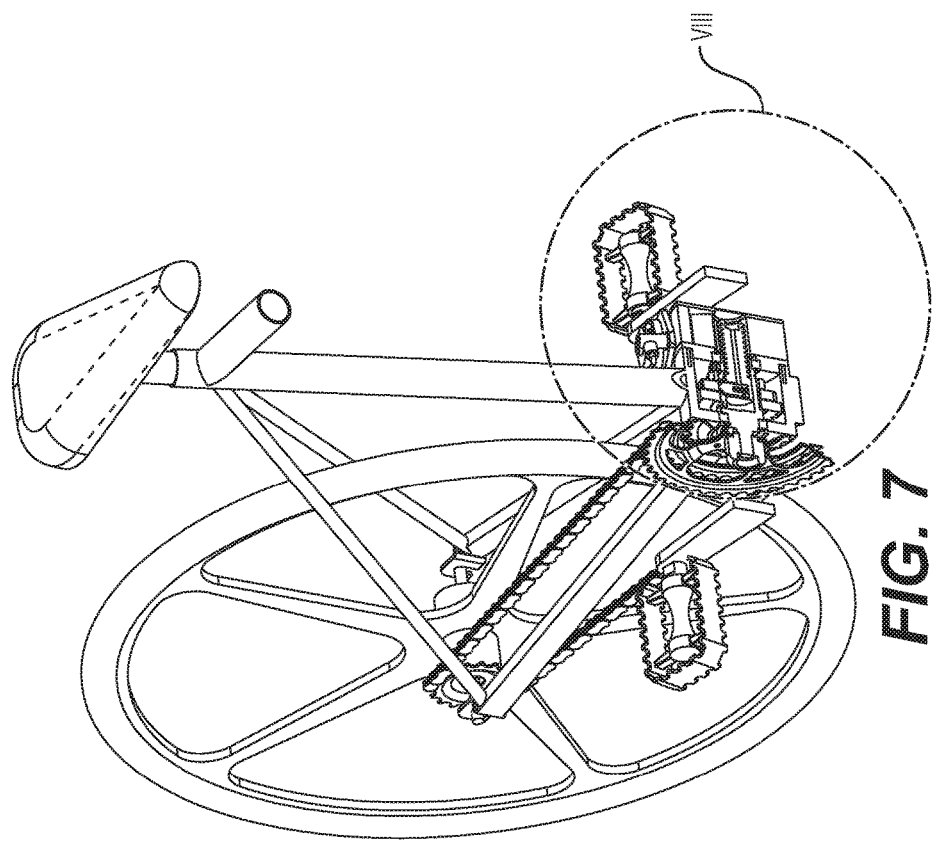
FIG. 7 illustrates a view of a portion of the bicycle of FIG. 1.
Figure 8:
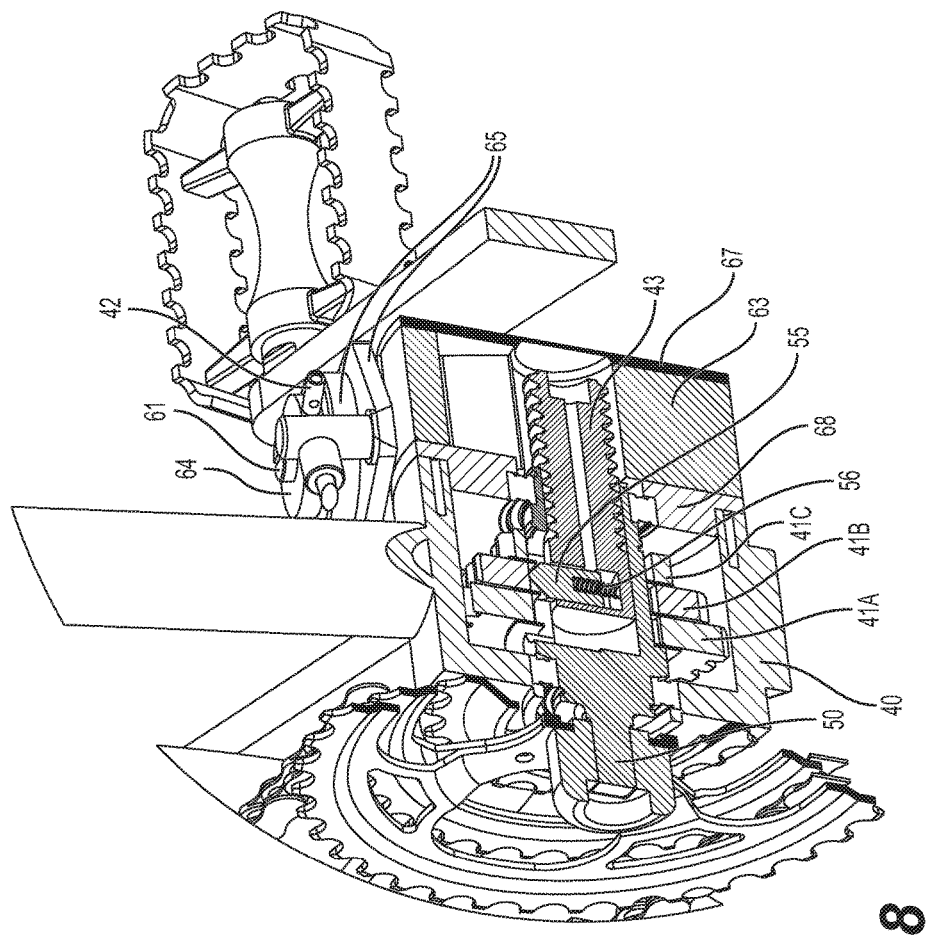
FIG. 8 illustrates a magnified view of the first embodiment included in circle VIII in FIG. 7.

FIG. 7 shows the bicycle in the previous figures but without the front wheel, the handlebar and part of the frame, the area being shown in detail in FIG. 8.

FIG. 8 details the previous figure, where the invented device is cut vertically, and shows the longitudinal shaft of the inner toothed shaft, the naked part of the cable that triggers the transmission box (42), the transmission box itself (40), the inner toothed shaft of that box (43), the latch (55) and the respective spring (56) integrated in the niche of this shaft, the outer (67) and inner lids (68) of the toothed shaft's box, the box itself (63) and also the upper (64) and middle lids (65) of this same box (63) of the toothed shaft, the top of this shaft (61)—not being, however, represented the entire development of the shaft, whose toothed form would engage in the inner toothed shaft (43), being also possible to view the sprockets (41A, 41B, 41C) of the transmission box (40) that spin in the outer shaft (50) of the transmission box, which in turn, operates as the motor shaft of the chainring.

Figure 9:
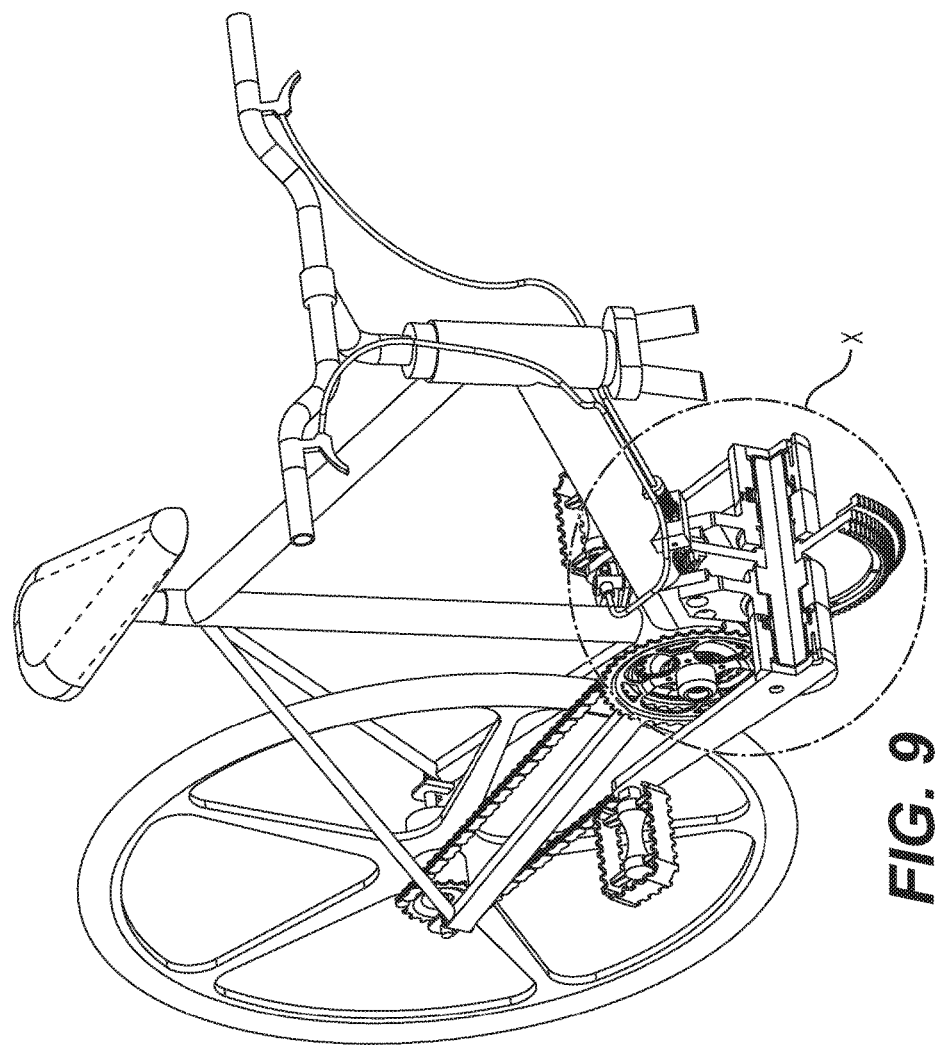
FIG. 9 illustrates a view of a portion of the bicycle of FIG. 1.
Figure 10:
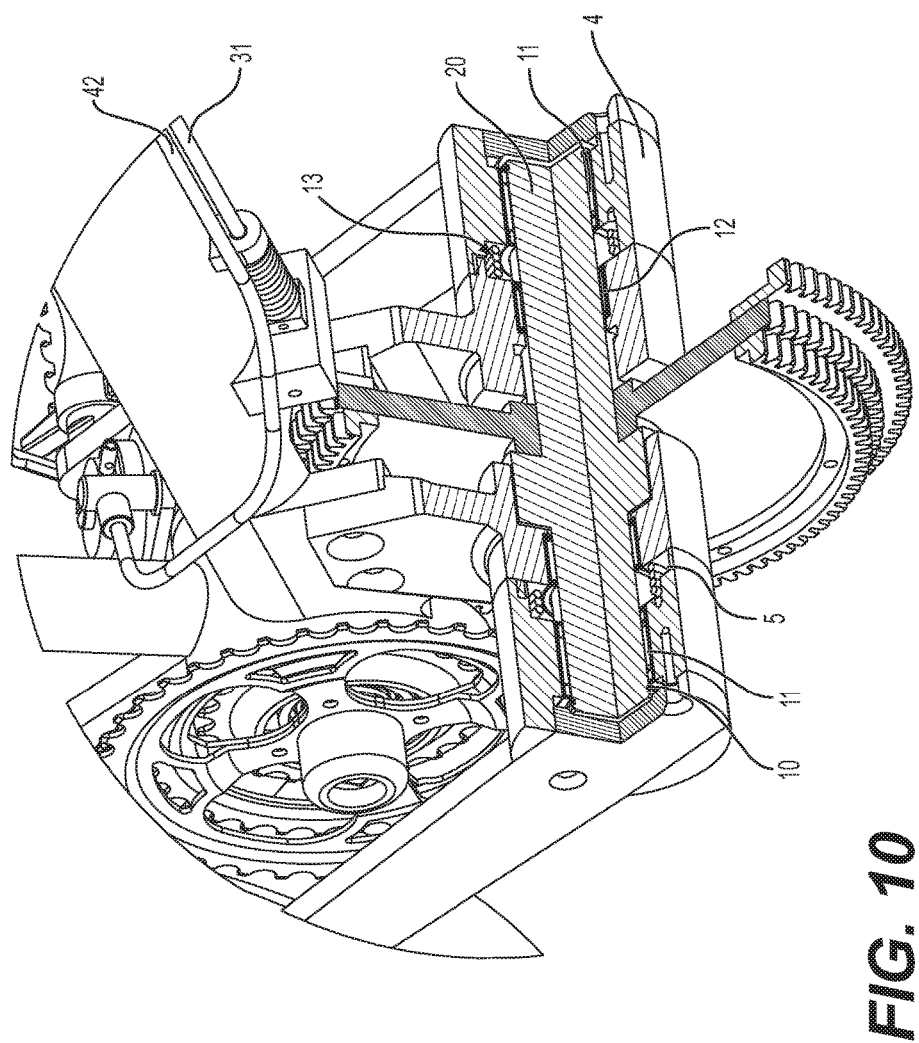
FIG. 10 illustrates a magnified view of the first embodiment included in circle X in FIG. 9.

FIG. 9 shows the bicycle represented in previous figures without the front wheel and the respective fork, the area being shown in detail in FIG. 10.

FIG. 10 details the previous figure, showing the invented device cut vertically and horizontally, which contains the longitudinal shaft of the crankshaft (20), being that this part of the device is closer to the front wheel of the bicycle, a part that corresponds to the first quadrant, which is not represented with the exception of the braking mechanism—being possible to view the unidirectional bearing (11) of each crank box (4), the flutes (5) of these boxes, the bearings (12) of the fixed structure, the torsion springs (13) nestled in the inner end of these crank boxes (4), the pressure rings (10) fitted in the undercuts of the crankshaft, which are located at the ends of that shaft (20), and the cables that activate, respectively, the braking mechanism (31) and the transmission box (42).

Figure 11:
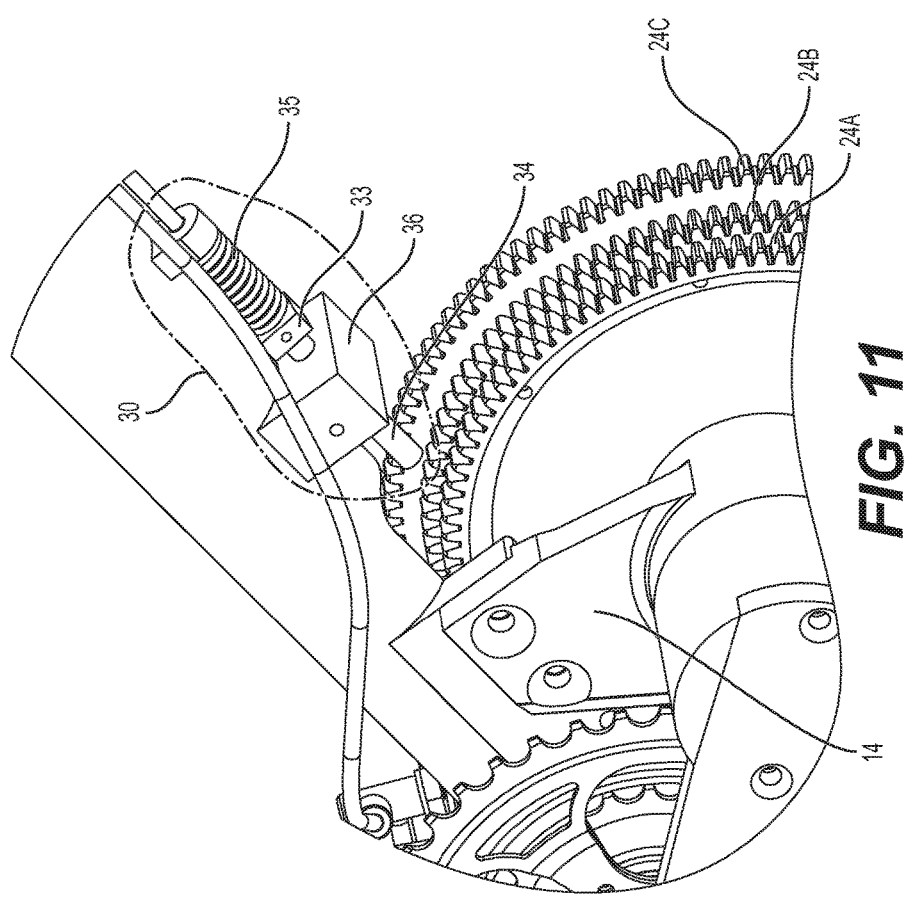
FIG. 11 illustrates a perspective view of the braking mechanism of the first embodiment.

FIG. 11 details the perspective of the braking mechanism (30), showing the fixed structure (14), where the top of the wedge (33) is in an upper position due to the compression of the spring (35), which means that the sprockets (24A, 24B, 24C) of the crankshaft (20) are not locked, because the wedge pin (34) is not latched into the sprockets (24A, 24B, 24C). A guide (36) of the wedge (33) also being shown in this figure.

Figure 12:
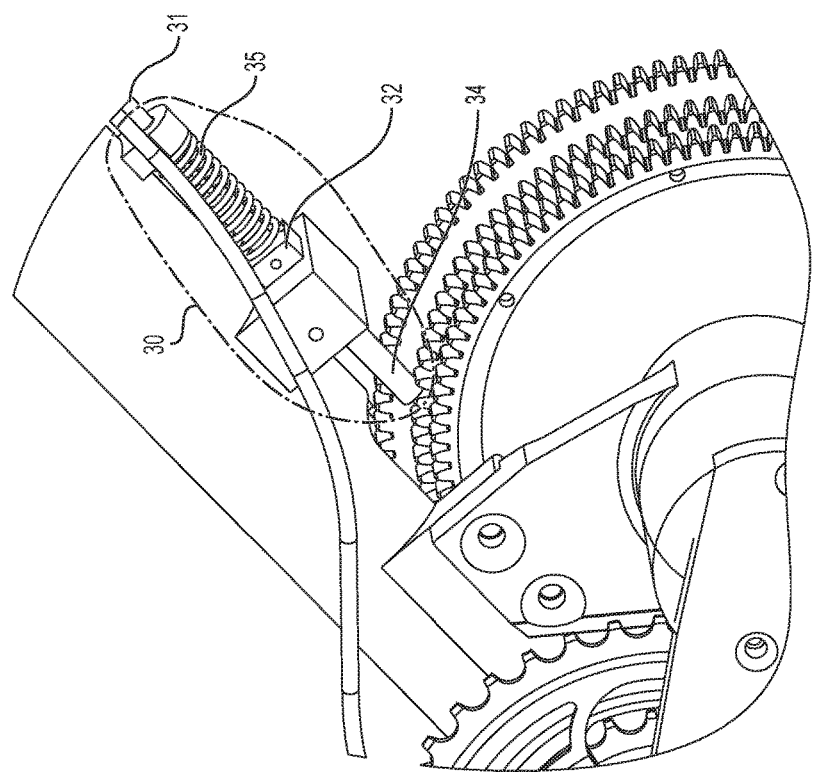
FIG. 12 illustrates another perspective view of the braking mechanism of the first embodiment.

FIG. 12 details the perspective of the braking mechanism (30), where the spring (35) is not under tension by the cable (31), enabling the wedge (32) to descend and the respective pin to latch into the sprockets of the crankshaft, preventing them from moving.

Figure 13:
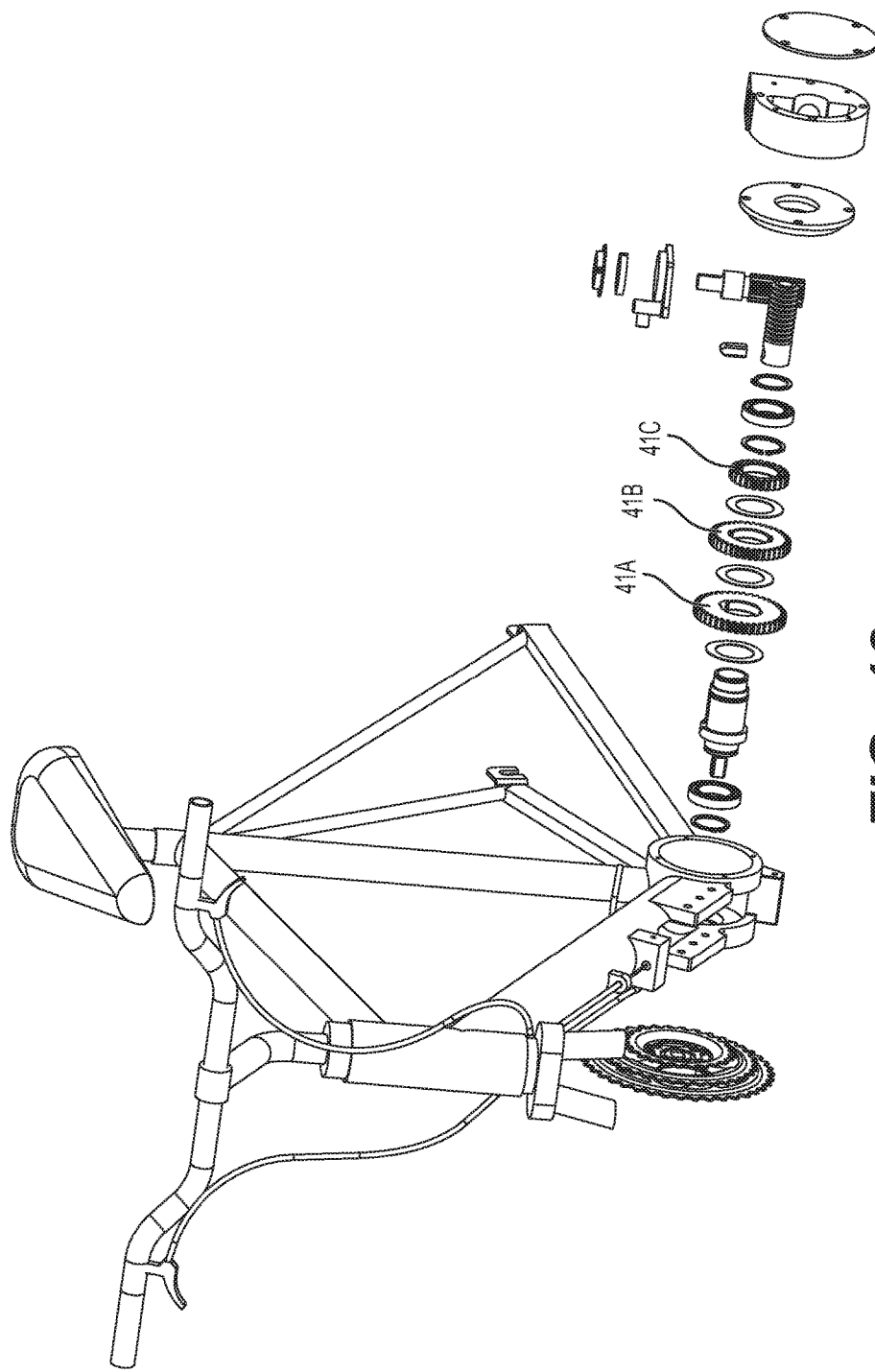
FIG. 13 illustrates an exploded perspective view of a portion of the first embodiment.

FIG. 13 details an exploded perspective of the invented device, being visible part of the device related to the transmission box, being represented, in sequence, the outer lid of the toothed shaft box, said box, and its inner lid that has an opening for the inner toothed shaft of the transmission box to engage in the toothed shaft, the latch and the latch spring that are integrated in this inner shaft, the middle lid of the toothed shaft's box where the torsion spring is kept, the upper lid of that same box that is connected to the top of the toothed shaft and that spins when the cable of the transmission box is under tension, making the toothed shaft also spin and placing the transmission gears in motion, meaning that when the cable is relieved the toothed shaft spins in the opposite direction (counterclockwise) by a joint action of the torsion spring that is connected, on one end, to the top of the toothed shaft and, in the other end to the middle lid of the toothed shaft's box, a pressure ring, a bearing, another pressure ring, the three sprockets (41A, 41B, 41C) of the transmission box (40), separated by spacer rings, the outer shaft of the transmission box, with its slot visible, another bearing and another pressure ring, showing the chainring at the end of this sequence.

Figure 14:
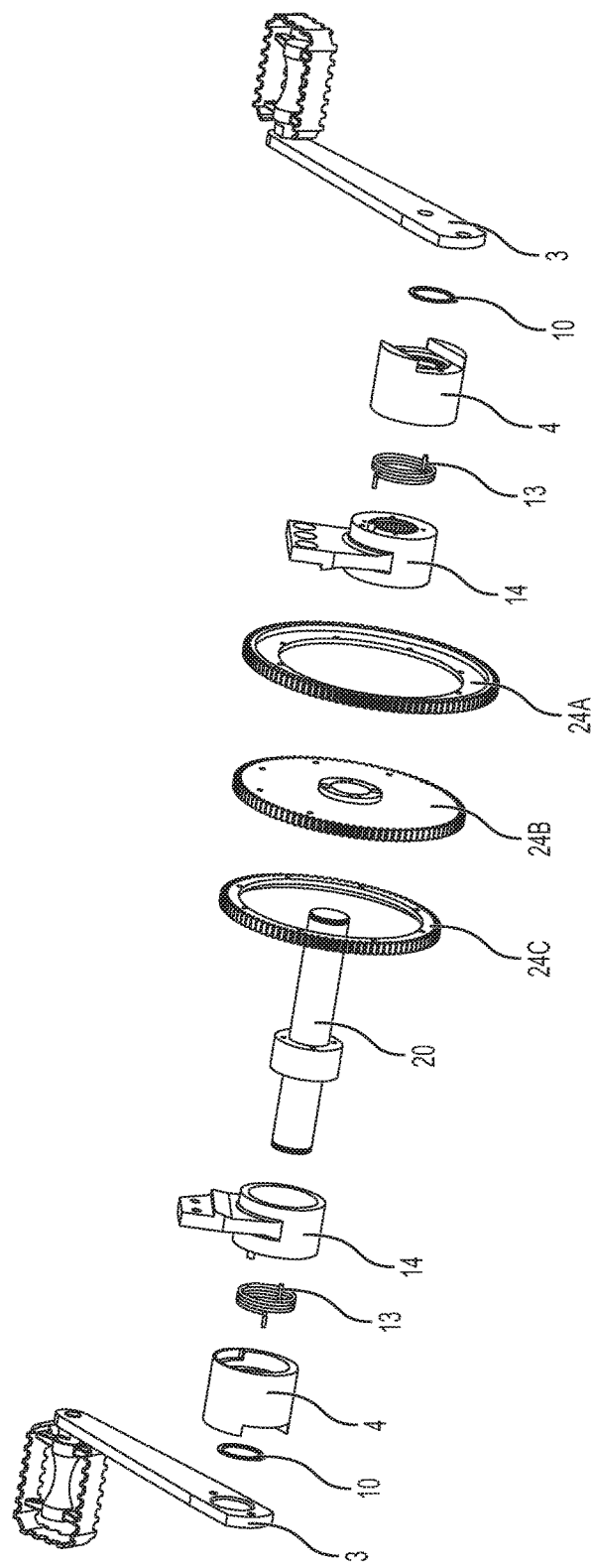
FIG. 14 illustrates another exploded perspective view of a portion of the first embodiment.

FIG. 14 details an exploded perspective of the invented device, being visible a crank (3) with a fixed pedal, a pressure ring (10), the crank's box (i.e., crank box) (4), a torsion spring (13), an element of the fixed structure (14), the (three) sprockets (24A, 24B, 24C) of the crankshaft (20), this shaft (20), another element of the fixed structure (14) of the other side of the bicycle's frame and from that side of the frame the sequence of the torsion spring, crank box, pressure ring and crank.

Figure 15:
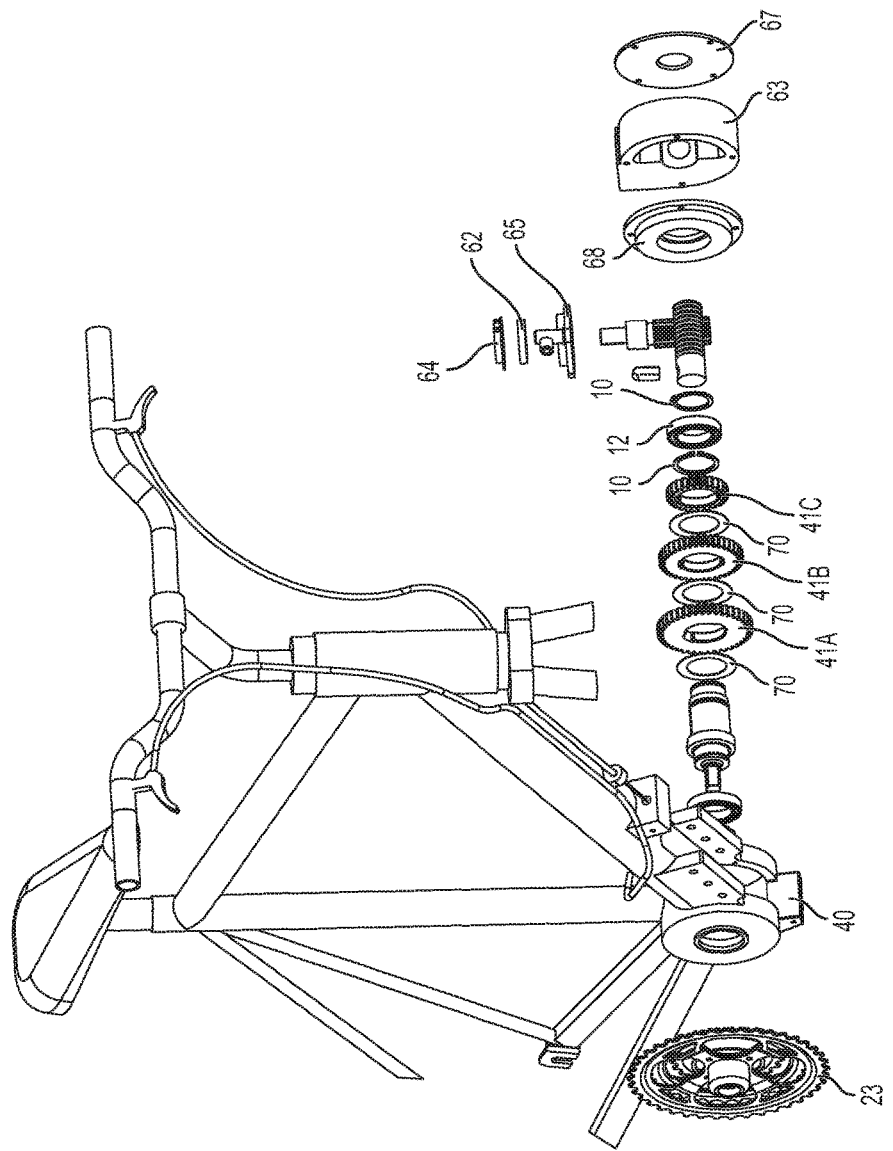
FIG. 15 illustrates another exploded perspective view of a portion of the first embodiment that is rotated approximately 90° in relation to FIG. 13.

FIG. 15 details an exploded perspective of the invented device, with the bicycle and that device rotated approximately 90° in relation to FIG. 13, a rotation made counter-clockwise, being visible, from left to right, the chainring (23), the transmission box (40), the sprockets (41A, 41B, 41C) of the transmission box (40) separated by spacer rings (70), a bearing (12) sided by pressure rings (10), the upper (64) and middle lids (65) of the toothed shaft's box, as well as the torsion spring (62), the inner toothed shaft of the transmission box, the toothed shaft, the latch and the latch spring, the inner (68) and outer lids (67) of the toothed shaft's box and, in their middle, that box (63).

Figure 16:
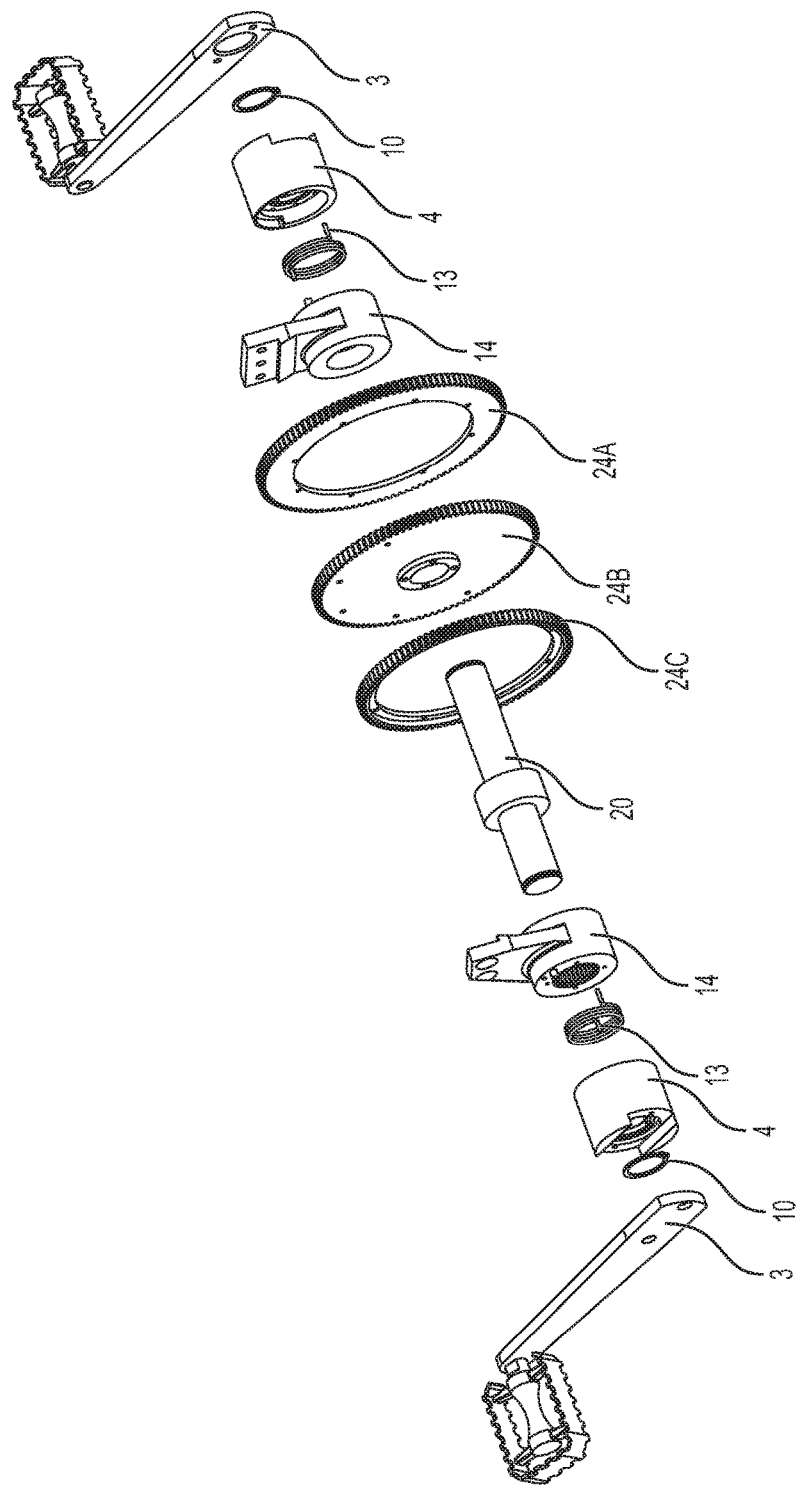
FIG. 16 illustrates another exploded perspective view of a portion of the first embodiment that is rotated approximately 90° in relation to FIG. 14.

FIG. 16 details an exploded perspective of the invented device, rotated approximately 90° in relation to FIG. 14, a rotation made counterclockwise, being visible, from left to right, the sequence of the crank (3), pressure ring (10), crank box (4), torsion spring (13), fixed structure (14), crankshaft (20), (three) sprockets (24A, 24B, 24C) of the crankshaft (20), another fixed structure (14), another torsion spring (13), another crank box (4), another pressure ring (10) and another crank (3).

Figure 17:
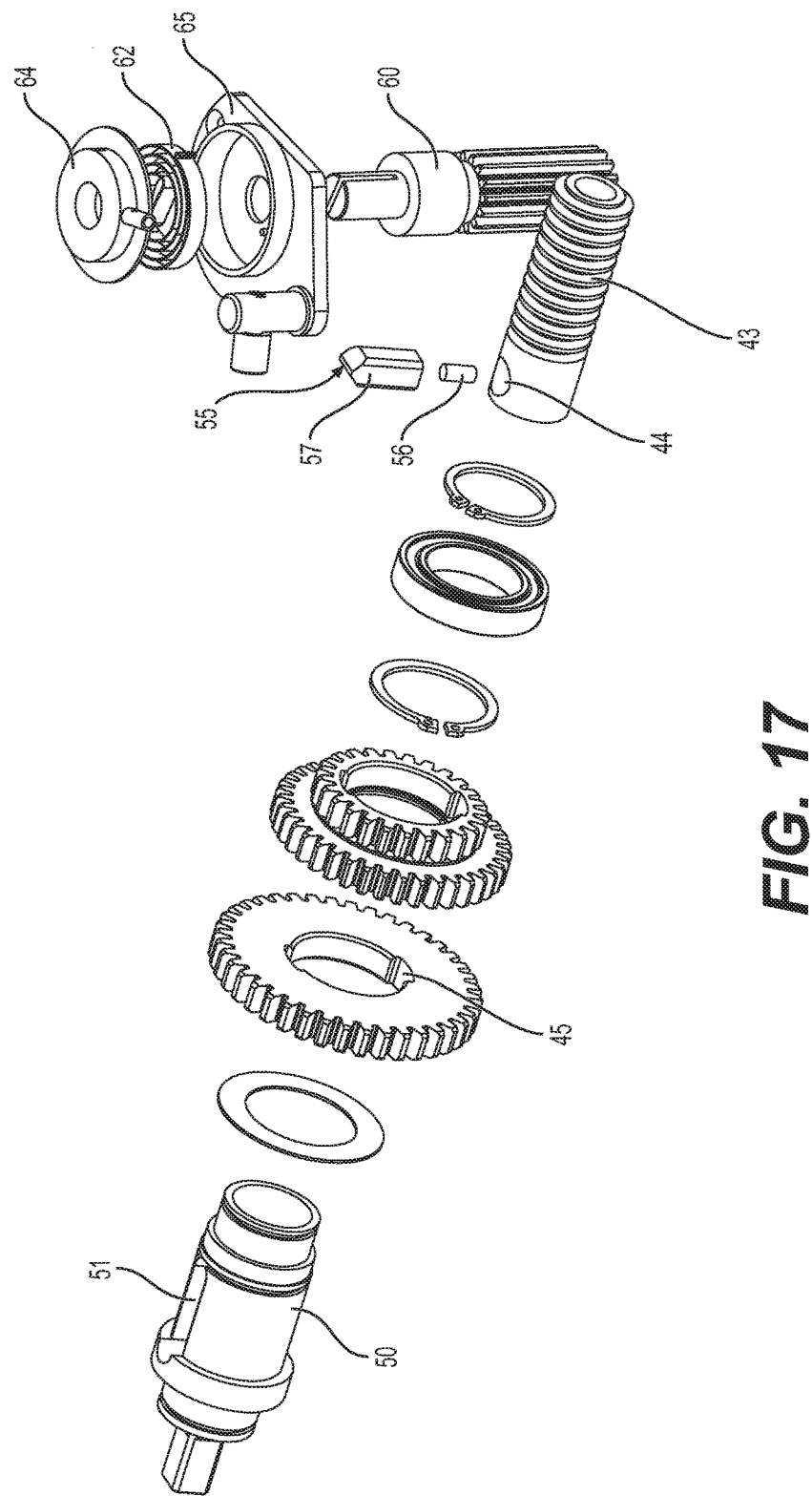
FIG. 17 illustrates a magnified and exploded perspective view of a portion of the first embodiment.

FIG. 17 details an exploded perspective of the invented device, showing, on a larger scale than in FIG. 13, part of the components of the transmission box, being quite visible the upper (64) and middle lids (65) of the toothed shaft's box, the torsion spring (62), the toothed shaft (60) and its screw top, the inner toothed shaft of the transmission box (43) and its niche (44), the latch spring (56), the latch (55) and its front side (57), one of the slots (45) in one of the sprockets of the transmission box, the outer shaft of the transmission box (50) and its slot (51).

Figure 18:
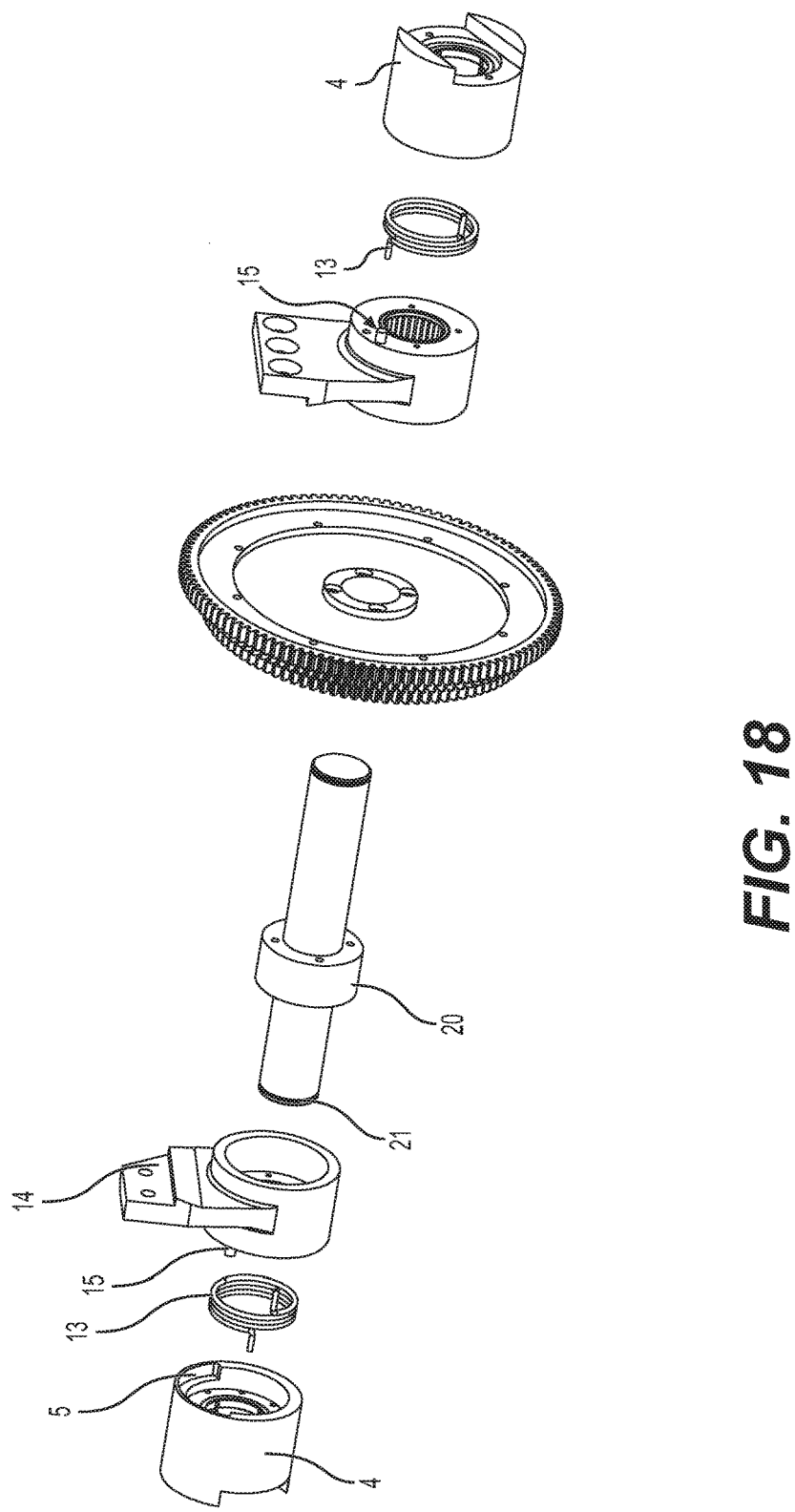
FIG. 18 illustrates another magnified and exploded perspective view of a portion of the first embodiment.

FIG. 18 details an exploded perspective of the invented device, showing, on a larger scale than in FIG. 14, part of the invented device, being visible, from left to right, the sequence of the crank box (4), the flute of this box (5), the torsion spring (13), the pin (15) of the fixed structure and the fixed structure itself (14), the recess of the crankshaft (21) and the crankshaft itself (20), its sprockets, another pin (15), another torsion spring (13) and another crank box (4).

In further detail, the previous figures show one of the possible features of the invention, where the invented device is fitted with a braking mechanism (30) that prevents the movement of the cranks (3).

In fact, when the cable (31) of the mechanism relieves the helical spring (35), the wedge (32) descends, latching to the teeth of one of the sprockets (24A, 24B, 24C) of the crankshaft (20), preventing the movement of this shaft (20) and, therefore, also the cranks (3);

On the contrary, when the cable (31) compresses the spring (35) it contracts and makes an ascending movement, carrying the wedge (32) to which it is connected, a connection that can be achieved through the wedge's top (33), as shown in the figures.

The cable (31) that activates the braking mechanism must be triggered through a handle located in the handlebar.

Whenever this braking mechanism (30) is not activated, when the cyclist places the cranks (3) in motion by applying force in the pedals (2), or handles, will make the crank box (4) of each crank (3) spin and apply tension to the torsion spring (13), being that this spinning movement is limited by the pin (15) that goes through the flute (5) present in every crank box (4).

The movement of the crank (3) is precisely limited by the movement that the pin (15) can perform from one end of the flute (5) to the other.

As soon as the cyclist applies force in the crank, through an up-down movement of the leg, the crank box (4) of that crank spins until it cannot move anymore, in other words, until the pin (15) leans to the other top of the flute (5), moving the crank to its lowest position closest to the ground, and once the movement that applied tension to the torsion spring (13) is made, this will return the crank to its initial position, forcing the crank to perform the return down-up movement.

The torsion spring (13) is nestled in the lower end of the crank box (4), attaching one of its ends to this box and the other end to the fixed structure (14) contiguous to said crank box (4).

As for the transmission box (40), which is also part of the invention and aims to solve the issue concerning the added weight from the sprockets (24A, 24B, 24C) activated directly by the crankshaft, its operation and conception can be made as detailed below.

The cable that triggers the transmission box (42) spins the upper lid of the toothed shaft's box (64).

This movement is transmitted to the toothed shaft (60), through its top (61), which is riveted in order to lock one of the ends of the torsion spring (62).

Depending whether the toothed shaft (60) spins or not, around its longitudinal axis, to one side or the other, leaving this spring (62) under tension or relieved.

Through the action of the cable/spring pair (42/62) this shaft (60) spins and is engaged to a toothed shaft (43)—the lower toothed shaft of the transmission box—moving crosswise, in other words, perpendicular to the alignment of the bicycle's wheels.

This inner toothed shaft (43) integrates a latch (55) with a spring (56), being possible for said shaft (43) to be fitted with a niche (44).

This latch (55), as soon as it latches to a single sprocket, each time, of the transmission box (40)—which spins fast while connected to the sprockets (24A, 24B, 24C) of the crankshaft (20)—makes the sprocket that is engaged to transmit the spinning movement.

The latch (55), in turn, with the front side (57), transmits this spinning movement to the outer shaft of the transmission box (50)—where the sprockets (41A, 41B, 41C) spin in the transmission box (40)—in whose slot (51) the latch is located.

The outer shaft (50), in turn, operates as the motor shaft of the chainring (23).

The latch (55) will have, preferably, a top beveled crosswise, since it is in this direction that the inner toothed shaft (43) controls it.

The sprockets (41A, 41B, 41C) of the transmission box (40) spin fast and the latch (55)—controlled by the inner toothed shaft (43) and in keeping with its crosswise movement—each time it finds a recess (45) of one of the sprockets, nestles in it by action of the respective spring (56), by transmitting the movement of the sprocket where it latched to the outer shaft of the transmission box (50) which is the motor shaft of the chainring (23).

LIST OF REFERENCE CHARACTERS

1—invented device (in the case of a bicycle)
2—pedal
3—crank
4—crank box
5—flute
10—pressure ring
11—unidirectional bearing
12—bearing
13—torsion spring
14—fixed structure
15—pin
20—crankshaft
21—recess of the crankshaft 23—chainring
24A, 24B, 24C—sprockets of the crankshaft
30—braking mechanism
31—cable that triggers the braking mechanism
32—wedge
33—wedge top
34—wedge pin
35—spring of the braking mechanism
36—guide of the wedge
40—transmission box
41A, 41B, 41C—sprockets of the transmission box
42—cable that triggers the transmission box
43—inner toothed shaft
44—niche of the inner toothed shaft
45—slot in the sprockets of the transmission box
50—outer shaft
51—slot of the outer shaft of the transmission box
55—latch
56—latch spring
57—front side of the latch
60—toothed shaft
61—top of the toothed shaft
62—torsion spring
63—toothed shaft box
64—upper lid of the toothed shaft box
65—middle lid of the toothed shaft box
67—outer lid of the toothed shaft box
68—inner lid of the toothed shaft box
70—spacer ring

The invention claimed is:
1. A device comprising:
a crank box fitted with a flute and a unidirectional bearing;
a torsion spring that is nested in the crank box;
a crankshaft including a plurality of sprockets;
at least one crank that has a pedal at one end of the at least one crank and the crank box on another end of the at least one crank, the crank box being located in front of the pedal; and
a braking mechanism for the plurality of sprockets of the crankshaft, wherein
the crank box is contiguous to a fixed structure fitted with a pin,
movement of the at least one crank is limited by movement of the pin in the flute,
one end of the torsion spring is attached to the crank box and another end of the torsion spring is attached to the fixed structure,
the plurality of sprockets of the crankshaft are attached to a plurality of sprockets of a transmission box,
the transmission box is fitted with an outer shaft having a slot and having an inner toothed shaft partially lodged therein,
the inner toothed shaft moving within the outer shaft, and
the inner toothed shaft including a latch that is configured to engage with the slot of the outer shaft to transmit movement of the plurality of sprockets of the transmission box to the outer shaft.

2. A device according to claim 1, wherein
the braking mechanism includes a wedge having a guide, and
a cable triggers the braking mechanism.

3. A device according to claim 2, wherein
the braking mechanism is fitted with a spring,
one end of the spring is connected to the cable that triggers braking mechanism, and
another end of the spring is connected to the wedge.

4. A device according to claim 1, wherein the inner toothed shaft is triggered by a toothed shaft.

5. A device according to claim 4, wherein the toothed shaft is perpendicular to the inner toothed shaft.

6. A device according to claim 1, wherein the latch is triggered by a spring.

7. A device according to claim 1, wherein
the inner toothed shaft includes a niche,
a spring of the latch nests in the niche, and
the latch is triggered by the spring.

* * * * *